Oct. 31, 1933.  D. F. SPROUL  1,933,034
CUSHIONING DEVICE
Filed June 20, 1931  2 Sheets-Sheet 1
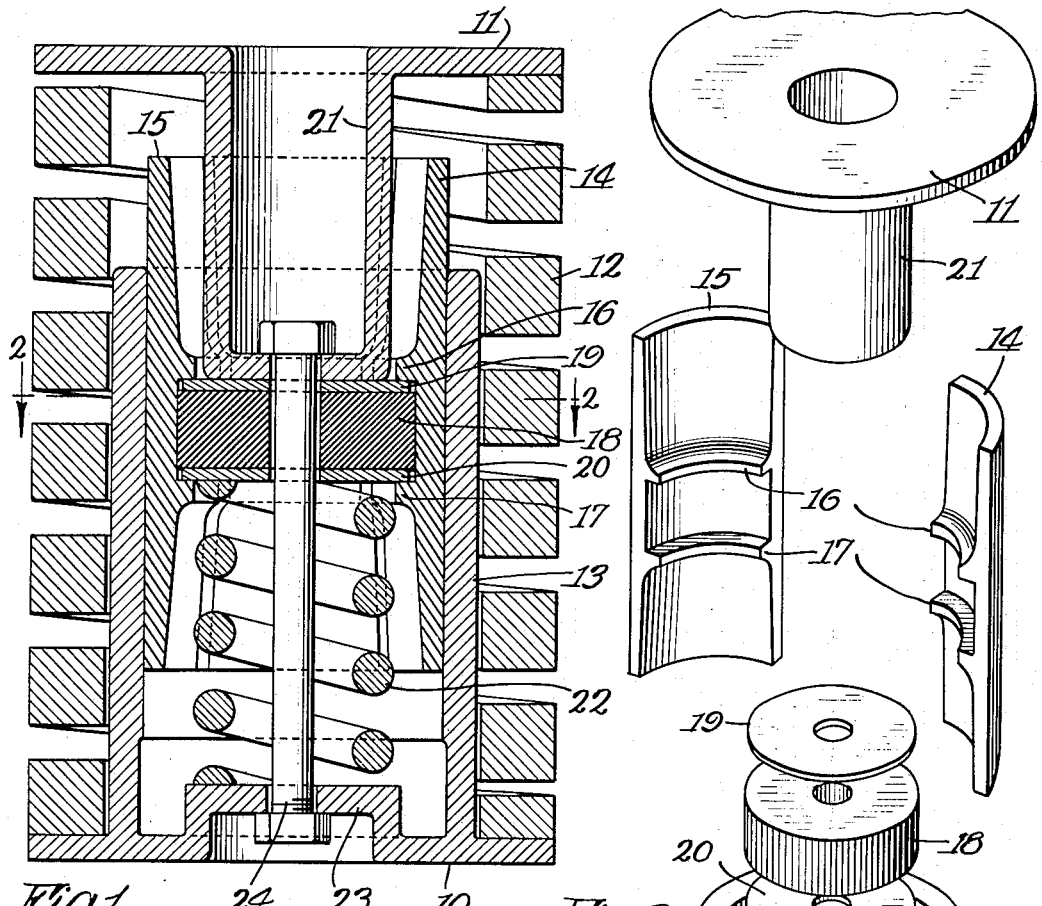
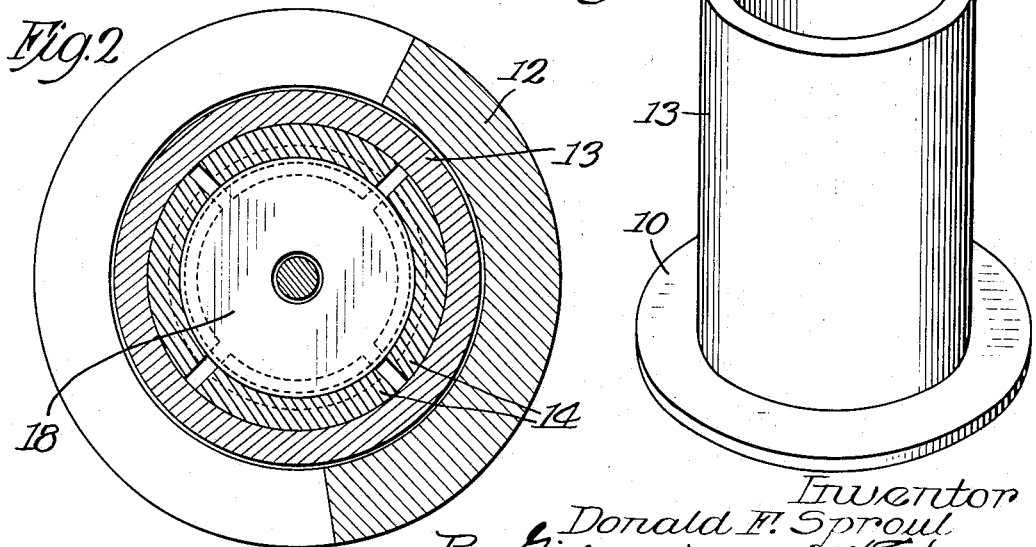
Inventor
Donald F. Sproul
By Gibson, Martin &co Attys.

Oct. 31, 1933.   D. F. SPROUL   1,933,034
CUSHIONING DEVICE
Filed June 20, 1931   2 Sheets-Sheet 2

Inventor
Donald F. Sproul

Patented Oct. 31, 1933

1,933,034

UNITED STATES PATENT OFFICE 1,933,034

CUSHIONING DEVICE

Donald F. Sproul, Chicago, Ill., assignor to Cardwell Westinghouse Company, a corporation of Delaware Application June 20, 1931. Serial No. 545,646

2 Claims. (Cl. 267—9)

The invention, while relating to cushioning devices generally, is described and illustrated in the accompanying drawings as a bolster support for railway cars.

In the drawings,

Fig. 1 is a central longitudinal section of the device;

Fig. 2 is a sectional view on the line 2—2 of Fig. 1;

Fig. 3 is a group in perspective of the various elements of the device;

Figure 4:
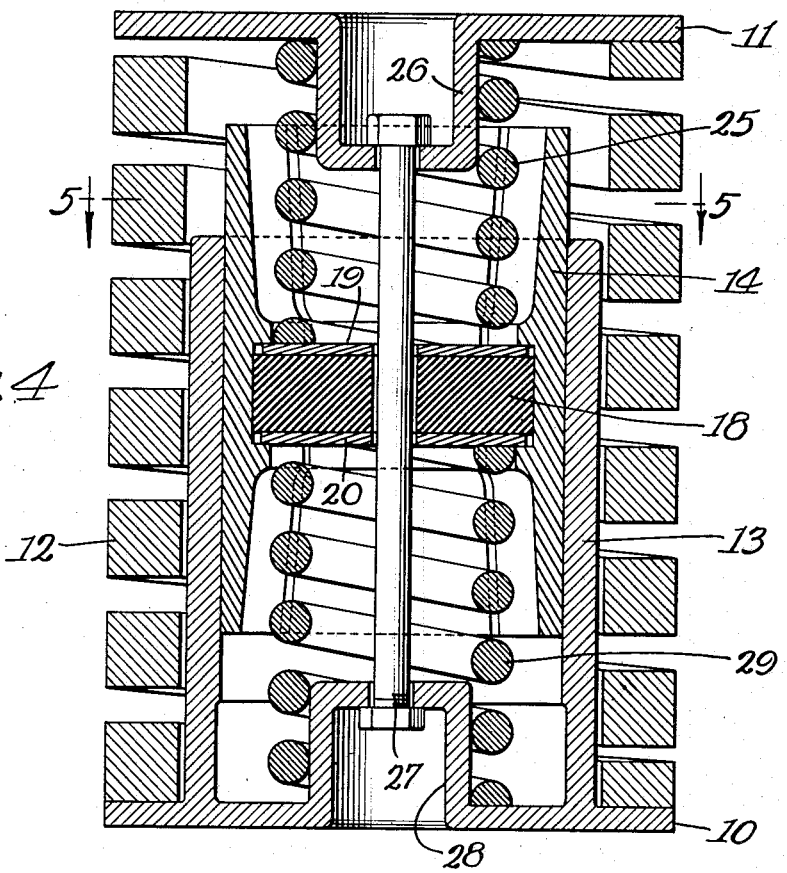
Fig. 4 is a view similar to Fig. 3, but showing a modified form of construction.

Between a pair of opposed followers 10, 11, there is interposed a spiral spring 12 and the following described friction elements.

A cylindrical barrel, shell or casing 13 is attached to one of the followers, as 10, being preferably, as shown, cast integral therewith. This cylinder is inclosed within the spring 12, and its length is such that it may serve as a limiting stop to prevent the overcompression of the spring. Oppositely disposed segmental friction shoes 14, 15, are inclosed within the casing 13, and engage its walls. Each of these shoes is provided intermediate of its ends with a pair of instanding segmental flanges 16, 17, between which there is interposed a block 18 of elastic material, such as rubber, a pair of metal plates 19, 20, being applied to the radial faces thereof.

A hollow thrust element, as 21, projects inwardly from the follower 11, and is preferably, as shown, cast integral therewith, and bears upon the plate 19. A helical spring 22 is interposed between the plate 20 and an instanding hollow boss 23 formed integral with the follower 10. A tie-bolt 24, located on the axis of the device, binds together the thrust element 21 and boss 23, passing freely through both of these members and the block 18 and plates 19, 20. This bolt serves as means for holding all of the parts of the device in assembly, and also for regulating the initial tension of the elements inclosed within the casing 13. Preferably two pairs of friction shoes are employed, but the number may be varied as desired.

The form of construction shown in Figs. 4 and 5 differs from that already described only in the following particulars.

In lieu of a solid thrust element, as 21, a helical spring 25 is interposed between the follower 11 and the plate 19, thereby providing for the yielding application of pressure to both sides of the elastic block 18. A short hollow boss 26 depends from the follower 11 to receive the tie-bolt 27, and the hollow boss 28, projecting inwardly from the lower follower 10, is somewhat elongated beyond the longitudinal dimension of the boss 23 to provide, with the chamber of the boss 26, ample clearance for the bolt as the device is compressed.

In the device of this modification, also, the lower boss 28 is of less diameter than the boss 23, and the lower spring 29 is seated directly upon the follower plate.

Upon the application of compressive force to either of the end followers they are caused to relatively approach against the resistance of the spring 12 and the enclosed friction devices.

In the form of construction of Figs. 1 to 3, the shoes 14, 15, are positively advanced relatively to the casing 13, by the application of pressure to the plate 19, and the spring 22 is compressed. Due to the resistance of this spring the pressure applied to the elastic block 18 causes the radial expansion of the latter, increasing the pressure of the shoes upon the walls of the casing 13,—this outward pressure increasing as the shoes are advanced. Upon the cessation of pressure the parts are restored to normal positions mainly by the action of the spring 12, supplemented by that of the spring 22, and the axial expansion of the block 18.

Figure 5:
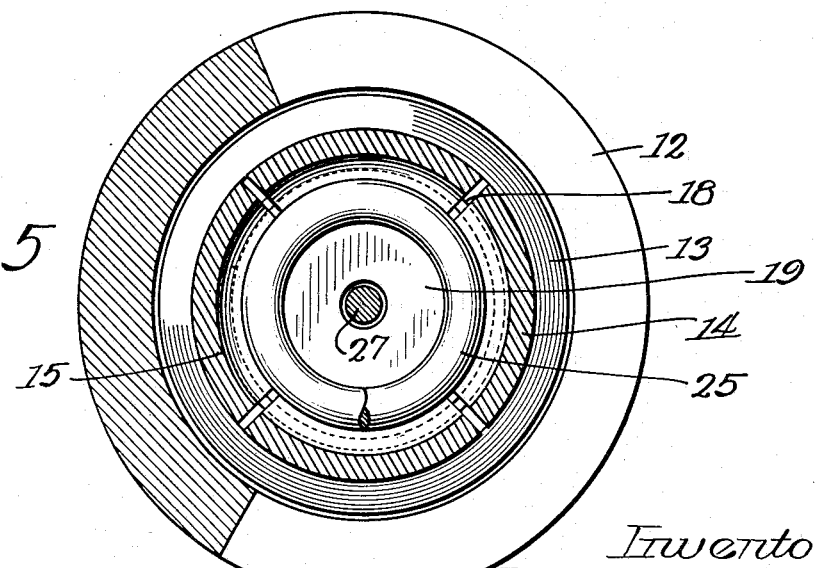
Fig. 5 is a sectional view on the line 5—5 of Fig. 4.

The action of the device shown in Figs. 4 and 5 is the same, with the exception that as the pressure is applied yieldingly to both faces of the block 18 the lighter shocks are absorbed by the springs, the friction coming into play to resist the heavier shocks.

In both forms of construction the initial compression of the device may be regulated by the bolt 24 or 27.

I claim as my invention—

1. A cushioning device comprising, in combination, a cylindrical barrel having an internal friction surface, segmental shoes frictionally engaging such surface and having transverse shoulders, a disc of rubber inclosed between rigid disc plates, seated against the shoulders, the peripheral surface of the rubber discs bearing directly against the shoes, a follower bearing upon one of the rigid plates, an opposed follower, and a helical spring reacting between the last-named follower and one of the rigid plates.

2. A cushioning device comprising, in combination, a cylindrical barrel having an internal friction surface, segmental shoes frictionally engaging such surface, a disc of rubber interposed between opposite shoes and engaging them by its peripheral surface, a metal seat for the disc interlocked with the shoes, a follower for compressing the disc upon its seat, an opposed follower, and a helical spring reacting between the latter follower and the seat.

DONALD F. SPROUL.